(12) United States Patent
Hellholm

(10) Patent No.: US 9,630,660 B2
(45) Date of Patent: Apr. 25, 2017

(54) DEVICE FOR VEHICLE CAB FOR A VEHICLE

(71) Applicant: BAE Systems Hägglunds Aktiebolag, Örnsköldsvik (SE)

(72) Inventor: Björn Hellholm, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 14/787,653

(22) PCT Filed: Apr. 25, 2014

(86) PCT No.: PCT/SE2014/050502
§ 371 (c)(1),
(2) Date: Oct. 28, 2015

(87) PCT Pub. No.: WO2014/182217
PCT Pub. Date: Nov. 13, 2014

(65) Prior Publication Data
US 2016/0083022 A1    Mar. 24, 2016

(30) Foreign Application Priority Data
May 8, 2013    (SE) ...................................... 1350567

(51) Int. Cl.
*B62D 33/063*    (2006.01)
*B62D 33/067*    (2006.01)
(Continued)

(52) U.S. Cl.
CPC ........... *B62D 33/063* (2013.01); *A01G 23/00* (2013.01); *B62D 33/067* (2013.01);
(Continued)

(58) Field of Classification Search
CPC   B62D 33/063; B62D 33/067; B62D 33/0636; B62D 55/0655; A01G 23/00; B66C 13/54
(Continued)

(56) References Cited

U.S. PATENT DOCUMENTS

2010/0147603 A1    6/2010   Davis et al.

FOREIGN PATENT DOCUMENTS

DE    3403597 A1    8/1985
DE    3531854 A1    3/1987
(Continued)

OTHER PUBLICATIONS

International Preliminary Report on Patentability received for PCT Patent Application No. PCT/SE2014/050502, mailed on Nov. 19, 2015, 6 pages.

(Continued)

*Primary Examiner* — Pinel Romain
(74) *Attorney, Agent, or Firm* — Morrison & Foerster LLP

(57) ABSTRACT

The present invention relates to a device for a vehicle cab of a vehicle, said vehicle cab comprising a cab module configured for attachment to a chassis beam via a support device arranged to support said cab module, said support device comprising rotation means for rotation of said vehicle cab, wherein said support device comprises elevation means for raising/lowering of said cab module. The present invention also relates to a vehicle with a device for a vehicle cab.

17 Claims, 5 Drawing Sheets

(51) Int. Cl.
*B66C 13/54* (2006.01)
*A01G 23/00* (2006.01)
*E02F 9/16* (2006.01)
*B62D 55/065* (2006.01)

(52) U.S. Cl.
CPC ..... B62D 33/0633 (2013.01); B62D 33/0636 (2013.01); B66C 13/54 (2013.01); *B62D 55/0655* (2013.01); *E02F 9/166* (2013.01); *Y10S 903/903* (2013.01)

(58) Field of Classification Search
USPC .................................................. 296/190.04
See application file for complete search history.

(56) References Cited

FOREIGN PATENT DOCUMENTS

| DE | EP 2218593 A1 | * | 8/2010 | ......... B62D 33/0608 |
| EP | 897856 A1 | | 2/1999 | |
| FI | EP 2261107 A1 | * | 12/2010 | ......... B62D 33/0636 |
| WO | 2007/139878 A2 | | 12/2007 | |

OTHER PUBLICATIONS

International Search Report and Written Opinion received for PCT Application No. PCT/SE2014/050502, mailed on Aug. 13, 2014, 12 pages.

* cited by examiner

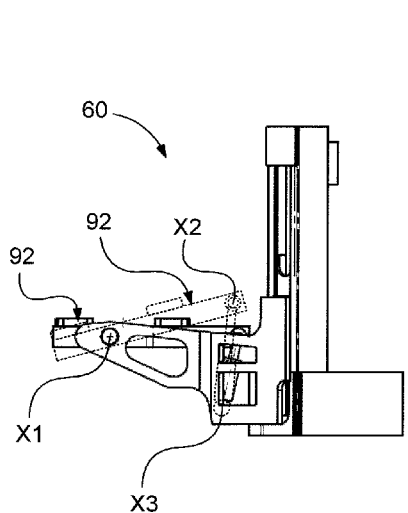
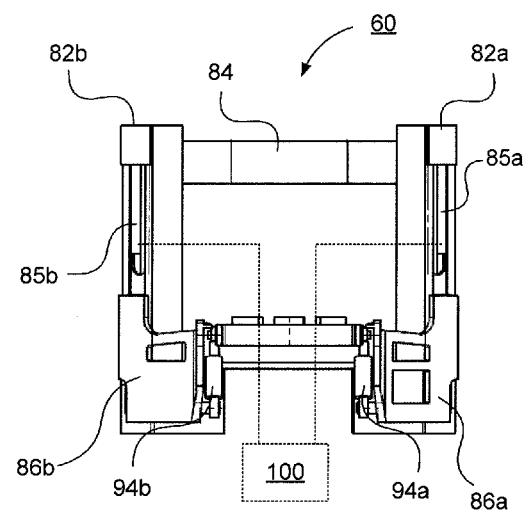
Fig. 5a  Fig. 5b
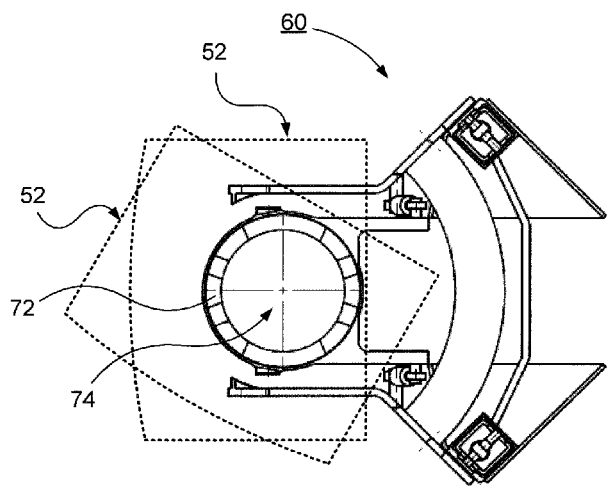
Fig. 5c

DEVICE FOR VEHICLE CAB FOR A VEHICLE

CROSS REFERENCE TO RELATED APPLICATIONS

This application is a U.S. National Stage patent application of PCT/SE2014/050502, filed on Apr. 25, 2014, which claims priority to Swedish Patent Application No. 1350567-2, filed on May 8, 2013, the entire contents of which are incorporated herein by reference.

FIELD OF THE INVENTION

The present invention relates to a device for vehicle cab for a vehicle. The present invention also relates to a vehicle.

BACKGROUND OF THE INVENTION

Vehicle cabs for tracked and wheeled vehicles today generally offer limited possibilities to provide comfort based on the prevailing operative situation.

This is especially a problem for forestry vehicles where the terrain in which they are travelling is rough. With the limited abilities to provide comfort that are available today this results in the vehicle cab as well as the vehicle operator being subjected to a range of strains in the form of impacts and vibrations and that the driver has difficulty overviewing the immediate surroundings at which different types of operations planned to be executed by the forestry vehicle such as e.g. crane operation.

These disadvantages makes todays vehicle including tracked vehicle unsuitable for a number of different applications where there are demands on comfort and overview of the situation. This especially holds for vehicle intended for forestry such as forwarders typically being operated in rough terrain during long work shifts day and night wherein the strains for the vehicle operators become burdensome.

Consequently there is a need to present improvement within cab systems for tracked vehicles.

SUMMARY OF THE INVENTION

An object of the present invention is to provide a device for a vehicle cab for a tracked vehicle which facilitates improved comfort for a driver/vehicle operator during drive of the vehicle.

An additional object of the present invention is to provide a device for a vehicle cab for a tracked vehicle which facilitates improved visibility and perception of the situation for a vehicle operator.

An object of the present invention is to provide a device for a vehicle cab for a tracked vehicle which adapt automatically to the current situation.

These and other objects, apparent from the following description, are achieved by means of a device for a vehicle cab of a vehicle, and a vehicle as described below. Preferred embodiments of the device and vehicle are defined below.

According to the invention the objects are achieved by a device for a vehicle cab of a tracked vehicle, said vehicle cab comprising a cab module configured for attachment to a chassis beam via a support device arranged to support said cab module, said support device comprising rotation means for rotation of said vehicle cab, wherein said support device comprises elevation means for raising/lowering of said cab module. Hereby improved visibility and perception of the situation is facilitated for a vehicle operator in that the cab module when necessary apart from rotation also may be raised. Further improved comfort for a driver/vehicle operator during drive of the vehicle is facilitated by providing a damping function of said elevation means such that the comfort of the driver/vehicle operator of the cab module thus is improved.

According to an embodiment of the device said elevation means comprises an upright support element configured for stationary attachment to said chassis beam and an elevation support element configured for supporting said cab module and being displaceably connected to said upright support element. Hereby a stable construction facilitating said raising and lowering of the cab module is obtained.

According to an embodiment of the device said upright support element comprises at least one elevation actuator for selectively regulating the relative position between the upright support element and the elevation support element between a first and a second elevation position in longitudinal direction of said upright support element. Hereby an easy regulation of elevation position of the cab module is facilitated, where the regulation may be provided automatically and/or by means of actuators.

According to an embodiment of the device said elevation support element is displaceably connected to said upright support element via at least one guide path running longitudinally relative to said upright support element. Hereby the elevation movement of the elevation support element is facilitated for stable elevation of the cab module.

According to an embodiment of the device said guide path comprises at least one channel running in the longitudinal direction of said upright support element. Hereby the elevation movement of the elevation support element is facilitated for stable elevation of the cab module.

According to an embodiment of the device said at least one elevation actuator is a hydraulic actuator. A hydraulic actuator such as a hydraulic piston is well suited for such raising and lowering of a cab module.

According to an embodiment of the device said upright support element is configured for stationary attachment to said chassis beam such that the main extension of the direction of said upright support element becomes mainly orthogonal to said chassis beam. Hereby a stable and space efficient construction for said raising and lowering of the cab module is obtained.

According to an embodiment of the device said rotation means comprises a rotator connected to said cab module, said rotator being rotatable relative to said elevation means. Hereby a stable and efficient rotation of the cab module is facilitated.

According to an embodiment of the device said rotator is journally connected with said elevation means. Hereby a stable and space efficient construction is obtained.

According to an embodiment of the device said rotator is configured to facilitate rotation of said cab module about a rotation axis mainly orthogonal to a plane formed by an underside of the cab module. Hereby rotation of the cab in a rotational direction facilitating supervision is enabled.

According to an embodiment of the device said support device comprises tilt means for tilting said cab module. Hereby is facilitated to keep the cab module horizontal when the vehicle leans such as e.g. in a down slope, wherein consequently additional improved comfort during drive of the vehicle is facilitated.

According to an embodiment of the device said tilt means comprises a tilt support element pivotally connected to said elevation means about a tilt axis running transverse to the longitudinal direction of the vehicle such that said tilt support element is tiltable about said tilt axis for causing tilt of said cab module. Hereby is facilitated to keep the cab module horizontal when the vehicle leans such as e.g. in a down sloop, independent of rotational position of the vehicle, wherein consequently an additional improved comfort during drive of the vehicle is facilitated.

According to an embodiment of the device said tilt support element comprises at least one tilt actuator for selectively regulating tilt about said tilt axis between a first and a second tilt position. Hereby easy regulation of tilt position of the cab module is facilitated, where the regulation may be provided automatically and/or by means of actuators.

According to an embodiment of the device said at least one tilt actuator is a hydraulic actuator. A hydraulic actuator such as a hydraulic piston is very suitable for such tilting of a cab module.

According to an embodiment of the device said at least one elevation actuator is configured for coupling to a gas accumulator with a restriction function such that said at least one elevation actuator also provides damping of said cab module. Hereby the comfort is further improved during drive of the vehicle.

According to an embodiment of the device at least one of said elevation means, tilt means and rotation means is arranged to be regulated automatically based on sensor data. Hereby improved comfort and visibility is improved without the driver/vehicle operator needing to perform manual regulation but can focus on driving the vehicle and/or other operator tasks.

According to an embodiment of the device at least one of said elevation means, tilt means and rotation means is arranged to be regulated manually based on control commands provided by a vehicle operator via an actuator. Hereby improved comfort and visibility is facilitated, where the vehicle operator may affect positions of the cab module as needed.

According to an embodiment of the device said actuator is arranged to provide pre-programmed positions for regulation of at least one of said elevation means, tilt means and rotation means. Hereby improved comfort and visibility is facilitated where the vehicle operator easily may utilize said pre-programmed positions, and thus demands a little effort from the vehicle operator/driver who consequently can focus on driving the vehicle and/or other operator tasks, but at the same time have the opportunity to affect positions of the cab module.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 3b schematically illustrates a side view of the vehicle cab in FIG. 3a;

FIG. 4a schematically illustrates a perspective view viewed obliquely from above of a device for a vehicle cab according to an embodiment of the present invention and FIG. 4b a perspective view viewed obliquely from below of the device in FIG. 4a;

FIG. 5a schematically illustrates a side view of the device in FIG. 4a-b;

FIG. 5b schematically illustrates a front view of the device in FIG. 4a-b;

FIG. 5c schematically illustrates a plan view of the device in FIG. 4a-b; and

DETAILED DESCRIPTION OF THE INVENTION

Herein the term "link" refers to a communication link which may be a physical connector, such as an optoelectronic communication wire, or a non-physical connector such as a wireless connection, for example a radio or microwave link.

Figure 1:
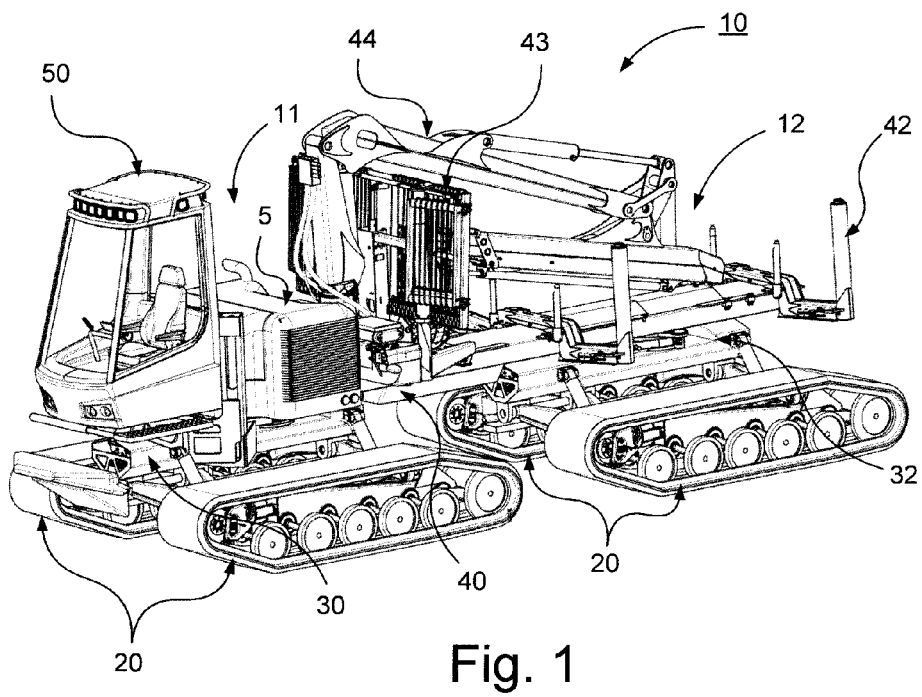
FIG. 1 schematically illustrates a perspective view of a tracked vehicle according to an embodiment of the invention.

With reference to FIG. 1 a tracked vehicle 10 according to the present invention, provided with a front vehicle unit 11 and a rear vehicle unit 12 is shown.

Each of the front and rear vehicle units comprise a track assembly pair 20. Said track assembly pair 20 is constituted or comprised of a drive unit pair. Said track assembly pair 20 comprises two track assemblies 21 arranged on opposite sides of the vehicle. The respective track assembly 21 is constituted or comprised of a drive unit. The respective track assembly 21 is constituted of a driving track assembly and is arranged for propulsion of the vehicle. The respective track assembly pair 20 is connected to an intermediate centre beam 30, 32, such as a chassis beam.

Said centre beam 30, 32 of the respective vehicle unit 11, 12 is arranged to support vehicle structure, e.g. in form of a vehicle cabin, power supplies, load carrying structure and a crane.

According to this configuration of the vehicle 10, the centre beam 30 of the front vehicle unit 11 is arranged to support a vehicle cabin 15 and a power supply 5, such as an internal combustion engine, where the internal combustion engine according to one embodiment is constituted of a diesel engine.

According to this configuration of the vehicle 10, the centre beam 30, 32 of the front and rear vehicle units 11, 12 is arranged to support a load-carrying structure comprising a load-carrying frame 40, where said load-carrying frame 40 according to this embodiment is configured to support a U-beam configuration 42 or a load beam configuration 42 for supporting timber and a loading gate 43. The load-carrying frame is according to this embodiment also arranged to support a crane 44 for loading/unloading of timber. The load-carrying frame 40 is configured to distribute load substantially centrally over the front and rear vehicle units 11, 12.

The exemplified vehicle 10 is a tracked forestry vehicle in form of a forwarder intended to transport timber from a harvesting site to a collection site. The vehicle 10 according to the present invention may be constituted by any suitable tracked vehicle. According to one embodiment, the vehicle 10 is a harvester intended for cutting timber.

The exemplified vehicle 10 is a diesel-electric driven vehicle. The vehicle 10 may according to one alternative have any suitable power supply for the propulsion of the vehicle. The vehicle 10 is according to one alternative a hybrid-powered vehicle. The vehicle 10 is according to one alternative electrically driven, where power according to one alternative is supplied by means of an energy storage device such as a battery unit, fuel cell or capacitor unit.

Figure 2:
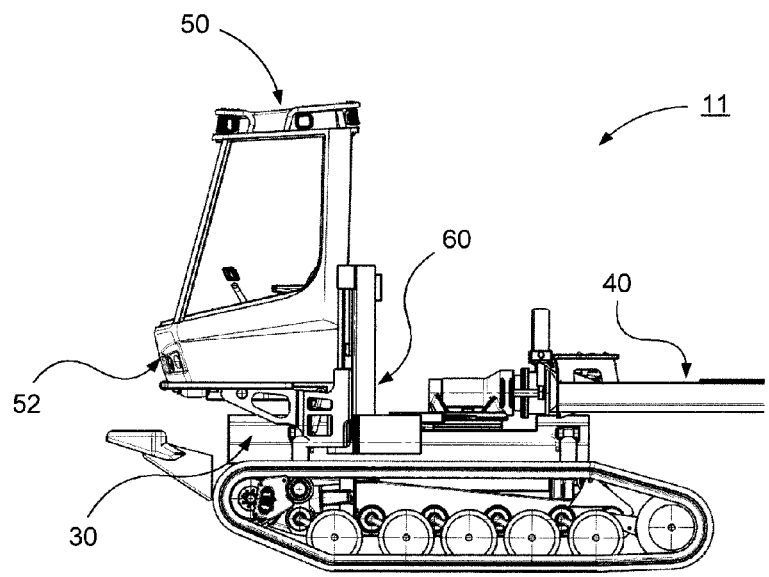
FIG. 2 schematically illustrates a side view of a front vehicle unit of the tracked vehicle in FIG. 1.

FIG. 2 schematically illustrates a side view of the front vehicle unit 11 of the tracked vehicle 10 in FIG. 1 with a vehicle cab 50 and a centre beam in the form of a chassis beam 30 and a part of the load-carrying frame 40. The vehicle cab 50 comprises a cab module 52 and a support device 60 for support and position change of the cab module 52. The vehicle cab 50 with cab module 52 and support device 60 is described in more detail with connection to FIG. 3*a-b* and FIGS. 4*a-b* and 5*a-c*.

Figure 3A:
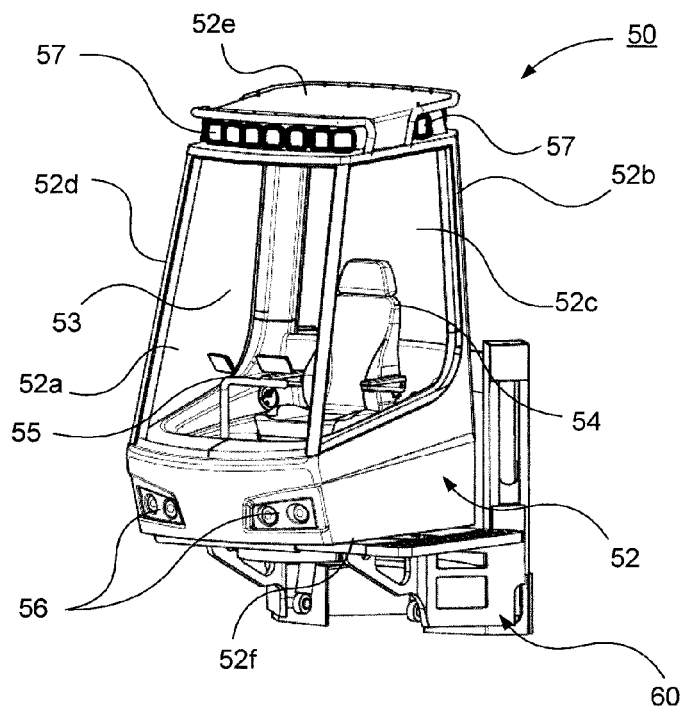
FIG. 3a schematically illustrates a perspective view of a vehicle cab according to an embodiment of the present invention.
Figure 3B:
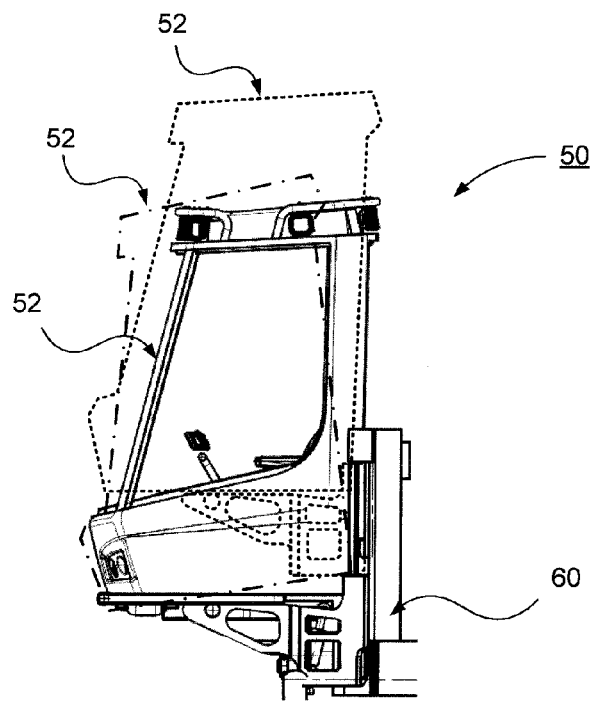
Figure 4A:
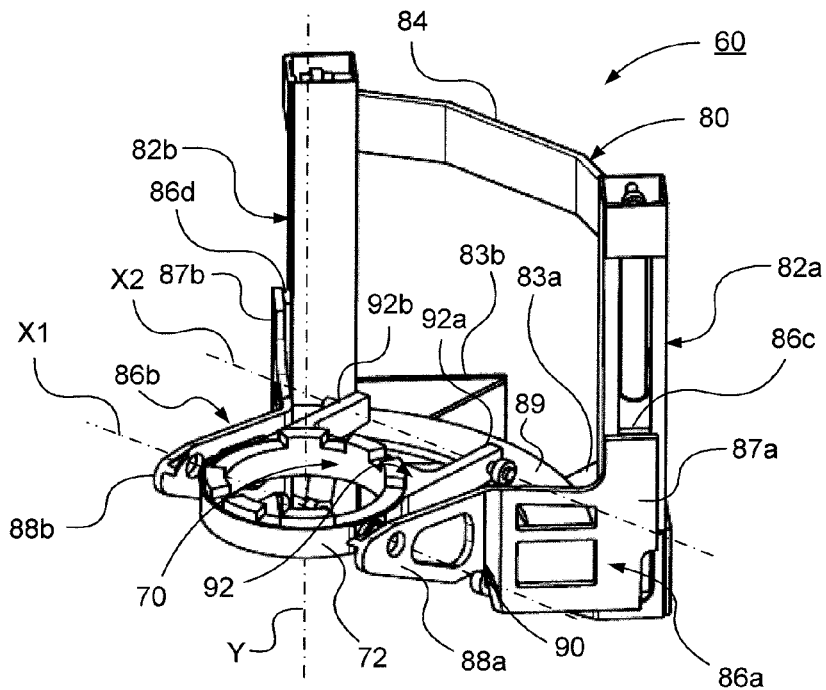
Figure 4B:
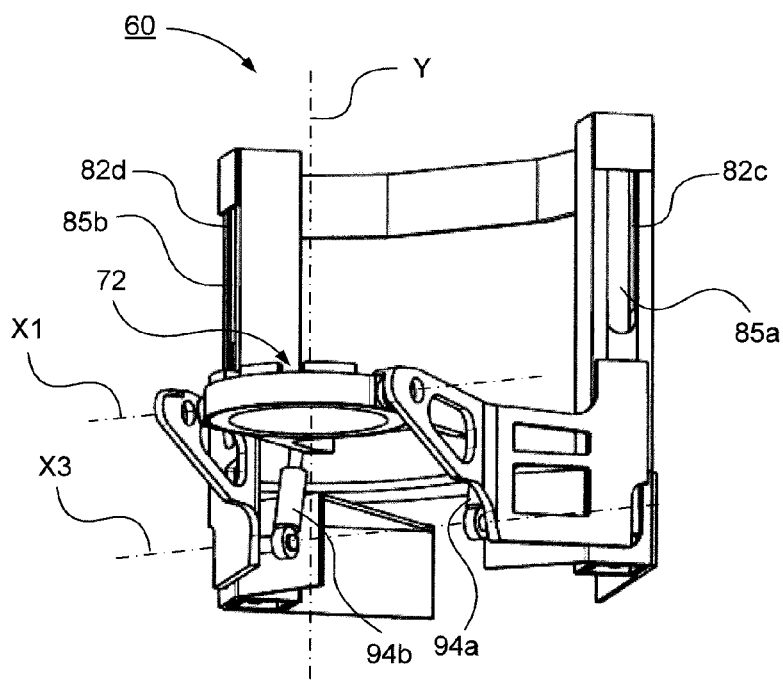

FIGS. 3*a-b* schematically illustrates different views of the vehicle cab 50 for a vehicle operator according to an embodiment of the present invention.

Said vehicle cab 50 comprises said cab module 52. The cab module has a front side 52*a* with a front window, a rear side 52*b* with a rear window and a left side 52*c* and a right side 52*d* provided with side windows. The cab module further has an upper side 52*e* and an underside 52*f*.

The cab module 52 has an interior space 53 in which a vehicle operator is intended to be housed during operation of the vehicle. The vehicle cab 50 comprises an operator seat 54 for the vehicle operator arranged in the interior space and actuators 55 for actuation of the vehicle.

The vehicle cab 50 comprises lighting units 56 arranged at a lower area of the front side 52*a* of the vehicle. The vehicle cab 50 further comprises lighting units 57 arranged in an upper area of the front side, rear side and right and left side of the vehicle.

The vehicle cab 50 comprises said support device 60 arranged to support said cab module 52. The vehicle cab 50 is configured for attachment to said chassis beam of the vehicle via said support device 60. Said support device 60 is described in more detail with reference to FIGS. 5*a-b* and 5*a-c*.

FIGS. 3*a-b* and 5*a-c* schematically illustrate different views of a device for a vehicle cab 50 according to an embodiment of the present invention.

Said device 60 comprises rotation means 70 for rotation of said vehicle cab 50. FIG. 5*c* illustrates a plan view viewed from above of the support device 60 with the cab module 52 schematically plotted with pointed line in a first position where the front side 52*a* of the cab module 52 is faced forward in the vehicle and a second rotated position where 50 the cab module 52 is rotated such that the front side 52*a* of the vehicle faces obliquely to the left relative to the vehicle.

Said support device 60 further comprises elevation means 80 for raising/lowering of said cab module 52. Said elevation means 80 is consequently configured for moving the cab module 52 vertically relative to the chassis beam of the vehicle. FIG. 3*b* illustrates said cab module 52 in a first non-elevated position and a second position plotted with a pointed line.

Said support device 60 further comprises tilt means 90 for tilting said cab module 52. Said tilt means 90 is configured to tilt said cab module 52 about an axis running transversely to the longitudinal direction of the vehicle. FIG. 3*b* illustrates said cab module 52 in a first non-tilted position and a second tilted position plotted with a dotted line.

Said elevation means 80 comprises an upright support element 82 configured for stationary attachment to said chassis beam. Said elevation means 80 further comprises an elevation support element 86 configured for supporting said cab module 52. Said elevation support element 86 is displaceably connected to said upright support element 82 for said raising and lowering of the cab module 52 of the vehicle cab 50.

Said upright support element 82 comprises a first upright post unit 82*a* arranged fixedly connected to the chassis beam by means of a fastening configuration 83*a* arranged in the lower portion. Said upright support element 82 further comprises a second upright post unit 82*b* arranged opposite to and at a distance from the first post unit 82*a*. The second post unit 82*b* is arranged fixedly connected to the chassis beam by mans of a fastening configuration 83*b* arranged in the lower portion.

Said upright support element 82 is consequently configured for stationary attachment to said chassis beam such that the main direction of extension of said upright support element 82 and hereby the main extension of direction of said first and second post units 82*a*, 82*b* becomes mainly orthogonal to said chassis beam.

Said upright support element 82 further comprises an intermediate strut element 84 arranged between said first and second post units 82*a*, 82*b* connecting said first and second post units 82*a*, 82*b* in an upper area of the same.

The respective post unit 82*a*, 82*b* comprises a guide path 82*c*, 82*d* running in its longitudinal direction. Said elevation support element 86 is arranged to run in said guide paths 82*c*, 82*d*. Said guide path 82*c*, 82*d* of the respective post unit 82*a*, 82*b* is according to this embodiment constituted by a channel running in the longitudinal direction of the post unit 82*a*, 82*b*.

Said upright support element 82 is configured to accommodate a first elevation actuator 85*a* arranged in connection to the first post unit 82*a* and a second elevation actuator 85*b* arranged in connection to the second post unit 82*b*. Said elevation actuators 85*a*, 85*b* are arranged to selectively regulate the relative position between the upright support element 82 and the elevation support element 86 between a first and a second elevation position in the longitudinal direction of said upright support element 82. Said elevation actuators 85*a*, 85*b* are according to a variant constituted by hydraulic actuators 85*a*, 85*b*, according to a variant hydraulic pistons 85*a*, 85*b*, for height regulation of said cab module.

Said elevation support element 86 comprises a first elevation unit 86*a* intended to run in said guide path 82*c* of the first post unit 82*a* of the upright support element 82.

Said elevation support element 86 comprises a second elevation unit 86*b* intended to run in said guide path 82*d* of the second post unit 82*b* of the upright support element 82.

The respective elevation unit 86*a*, 86*b* comprises a guide portion 86*c*, 86*d* arranged to run along and by guided by means of said guide path. Said guide portion 86*c*, 86*d* is according to this variant constituted by a rail 86*c*, 86*d* arranged to run in the as a channel 82*c*, 82*d* configured guide path 82*c*, 82*d* of the respective post unit 82*a*, 82*b* for said elevation of the elevation support element 86. The respective elevation unit 86*a*, 86*b* is arranged to be controlled for raising and lowering by means of said elevation actuators 85*a*, 85*b*.

The respective elevation unit 86*a*, 86*b* is formed as a tongue projecting from the respective post unit 82*a*, 82*b* and running forward in the longitudinal extension of the vehicle.

The respective elevation unit 86*a*, 86*b* comprises a portion 87*a*, 87*b* running from the respective post unit 82*a*, 82*b* obliquely forward in the vehicle direction, the respective portion 87*a*, 7*b* being angled such that they run obliquely towards each other.

The respective elevation unit 86a, 86b comprises a connection portion 88a, 88b running in the extension of said angled portion 87a, 87b mainly straight forward in the vehicle direction for connection to a bearing configuration 72 of said rotation means.

Said elevation support element 86 further comprises an intermediate arc-shaped strut element 89 arranged between said angled portions 87a, 87b of said first and second elevation units 86a, 86b connecting said first and second elevation units 86a, 86b.

The respective elevation unit 86a, 86b comprises weight reducing recesses.

Said rotation means 70 comprises a rotator 74 fixedly connected to said cab module 52. Said rotator 74 is rotatable relative to said elevation means 80. Said rotator 74 is journally connected to said elevation means 80.

Said rotator 74 is configured to facilitate rotation of said cab module 82 about a rotation axis Y mainly orthogonal to a plane formed by an underside of the cab module 82.

Said rotation means 70 comprises said bearing configuration 72 comprising slide bearings. Said bearing configuration 72 is connected to the connection portion 88a, 88b of the respective elevation unit 86a, 86b. The connection portion 88a of the first elevation unit 86a is consequently connected on one side of the bearing configuration 72 and the connection portion 88b of the second elevation unit 86b is connected on the opposite side of the bearing configuration 72.

Said support device 60 further comprises tilt means 90 for tilting said cab module 52.

Said tilt means 90 comprises a tilt support element 92 pivotally connected about a tilt axis X1 running transversely to the longitudinal direction of the vehicle, with said elevation means 80 such that said tilt support element 92 may tilt about said tilt axis X1 for thus providing tilting of said cab module 52, see FIG. 3b.

Said tilt support element 92 comprises said bearing configuration 72.

Said pivotable connection with the elevation means 80 is according to this embodiment constituted by the connection of the connection portion 88a of the first elevation unit 86a and the connection portion 88b of the second elevation unit 86b on the opposite side of the bearing configuration 72. Said opposite connections of the connection portions 88a, 88b of the respective elevation unit 86a, 86b are aligned such that said tilt axis X1 running essentially transversal to the longitudinal direction of the vehicle is formed.

The connection portion 88a of the first elevation unit 86a is pivotally connected to one side of the bearing configuration 72 and the connection portion 88b of the second elevation unit 86b is pivotally connected to the opposite side of the bearing configuration 72 for facilitating tilting of said tilt support elements 92 and consequently tilting of the cab module 52 about said tilt axis X1.

Said tilt support element comprises a first tilt arm 92a and a second tilt arm 92b. Said first and second tilt arms 92, 92b constitute extensions of the bearing configuration 72 and are arranged at a distance from each other running from the respective side of the bearing configuration 72 backwardly in the longitudinal direction of the vehicle.

Said tilt support element 92 comprises a first tilt actuator 94a pivotally connected in one end in connection to a rear end area of the first tilt arm 92a and a second tilt actuator 94b pivotally connected in one end in connection to a rear end area of the second tilt arm 92b. Said pivotable connection to the respective tilt arm 92a, 92b of the first and second tilt actuators 94a, 94b forms a pivot axis X2.

Said first tilt actuator 94a is further in the second end arranged pivotally connected in connection to a lower area of said first elevation unit 86a. said second tilt actuator 94b is further in the second end arranged pivotally connected in connection to a lower area of said second elevation unit 86b said pivotable connection with the respective elevation unit 86a, 86b of the first and second tilt actuators 94a, 94b forms a pivot axis X3.

Said tilt actuators 94a, 94b are arranged to selectively regulate tilt about said tilt axis X1 with a first and second tilt position.

Said tilt actuators 94a, 94b are according to a variant hydraulic actuators 94a, 94b, according to a variant hydraulic pistons 94a, 94b, for tilt regulation of said cab module 52.

Said elevation actuators 85a, 85b are configured for coupling to a gas accumulator 100 with a restriction function such that said elevation actuators 85a, 85b thereby also provides damping of said cab module 52. Said gas accumulators are schematically illustrated in FIG. 5b. By thus providing a damping function of said elevation means improved comfort for a driver/vehicle operator during drive of the vehicle is facilitated.

By combining said rotation means for rotation of the cab module with said elevation means for raising and lowering of the vehicle in accordance with the invention improved visibility and situation perception for a vehicle operator is facilitated.

By combining said rotation means and elevation means with said tilt means for tilting the vehicle it is additionally facilitated to keeping the cab module horizontal when the vehicle leans such as e.g. in a downhill slope or uphill slope, independent of rotational position of the cab module, wherein consequently improved comfort during drive of the vehicle is facilitated.

Figure 6:
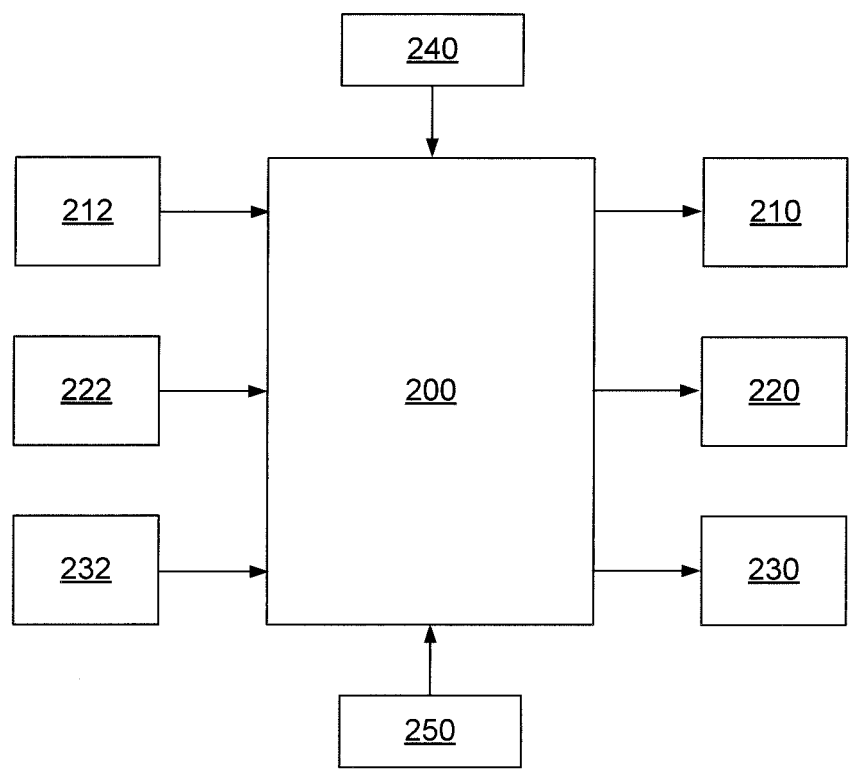
FIG. 6 schematically illustrates a system for position control of a cab module of a vehicle cab according to the present invention.

According to an embodiment at least one of said elevation means 80, tilt means 90 and rotation means 70 is arranged to be regulated automatically based on sensor data, where an example is shown in FIG. 6.

According to an embodiment at least one of said elevation means 80, tilt means 90 and rotation means 70 is arranged to be regulated manually based on control commands provided by a vehicle operator via an actuator, where an example is shown in FIG. 6.

According to an embodiment said actuator is arranged to provide pre-programmed positions for regulation of at least one of said elevation means 80, tilt means 90 and rotation means 70, where an example is shown in FIG. 6.

FIG. 6 schematically illustrates a system 1 for position controlling a cab module of a vehicle cab according to the present invention.

The system 1 comprises an electronic control unit 200 for said control.

The system 1 further comprises elevation sensor means 210 for determining elevation position of said cab module. Said elevation sensor means 210 may comprise any suitable sensor member for determining the height of the cab module relative to a non-elevating part of the vehicle such as the chassis beam, said post units or the corresponding.

The system 1 further comprises rotation sensor means 220 for determining rotation position of said cab module, i.e. which degree the cab module has rotated relative to the longitudinal extension of the vehicle. Said rotation sensor means 220 may comprise any suitable sensor member for determining the angle of the cab module relative to the longitudinal extension of the vehicle such as an angle sensor or the corresponding.

The system 1 further comprises tilt sensor means 230 for determining tilt position of said tilt module. Said tilt sensor means 230 may comprise any suitable sensor member for determining the tilt position of the cab module, i.e. which degree said tilt means has turned about said tilt axis, such as an angle sensor or the corresponding.

The system 1 further comprises inclination determination means 240 for determining the inclination of the vehicle relative to the horizontal plane, particularly the front vehicle unit provided with the cab module relative to the horizontal plane. According to a variant said inclination determination means 240 comprises a gyro.

The system 1 further comprises actuators for actuating the position of the cab module. Said actuator members may comprise any suitable actuator 250 for determining said actuation such as a handspike configuration with one or more handspikes, and/or joystick configuration with one or more joysticks, and/or button configuration with one or more buttons or the corresponding.

The system 1 further comprises elevation regulation means 212 for regulating elevation position of said cab module, i.e. regulate said elevation actuators. Said elevation regulation means 212 may comprise any suitable regulation member for regulating the height of the cab module relative to a non-elevating part of the vehicle.

The system 1 further comprises rotation regulation means 222 for regulating rotation position of said cab module, i.e. regulating said rotator. Said rotation regulation means 222 may comprise any suitable regulation member for regulating the angle of the cab module relative to the longitudinal extension of the vehicle, said rotation regulation means 222 according to a variant being comprised by said rotator.

The system 1 further comprises tilt regulation means 232 for regulating tilt position of said cab module, i.e. regulating said tilt actuators. Said tilt regulation means 232 may comprise any suitable regulation member for regulating the tilt position of the cab module, i.e. to which degree said tilt means has turned about said tilt axis.

The electronic control unit is signal connected to said elevation sensor means 210 via a link. The electronic control unit is via the link arranged to receive a signal from said elevation sensor means 210 representing elevation data for height position of the cab module.

The electronic control unit is signal connected to said rotation sensor means 220 via a link. The electronic control unit is via the link arranged to receive a signal from said rotation sensor means 220 representing rotation position data for rotation position of the cab module.

The electronic control unit is signal connected to said tilt sensor means 230 via a link. The electronic control unit is via the link arranged to receive a signal from said tilt sensor means 230 representing tilt data for tilt position of the cab module.

The electronic control unit is signal connected to said inclination determination means 240 via a link. The electronic control unit is via the link arranged to receive a signal from said inclination determination means 240 representing vehicle inclination data for inclination of the vehicle relative to the horizontal plane.

The electronic control unit is signal connected to said actuator 250 via a link. The electronic control unit is via the link arranged to receive a signal from said actuator 250 representing actuator data from control commands from the vehicle operator for actuating of the cab module, said actuation data comprising data for actuation for regulation of said elevation means 80 by means of said elevation regulation means 212, rotation means 70 by means of said rotation regulation means 222 and/or said tilt means 90 by means of said tilt regulation means 232.

The electronic control unit is signal connected to said elevation regulation means 212 via a link. The electronic control unit is via the link arranged to send a signal to said elevation regulation means 212 representing elevation regulating data for elevation regulation of the cab module.

The electronic control unit is signal connected to said rotation regulation means 222 via a link. The electronic control unit is via the link arranged to send a signal to said rotation regulation means 222 representing rotation regulation data for rotation regulation of the cab module.

The electronic control unit is signal connected to said tilt regulation means 232 via a link. The electronic control unit is via the link arranged to send a signal to said tilt regulation means 232 representing tilt regulation data for tilt regulation of the cab module.

The electronic control unit is arranged to process said elevation data, rotation position data, tilt data and/or inclination data and based on these data send signals to aid elevation regulation means 212, rotation regulation means 222 and/or tilt regulation means 232 for automatic regulating of said elevation means 80, rotation means 70 and/or tilt means and consequently regulation of positions of said cab module 52.

The electronic control unit is arranged to process said actuation data and based on these data send signals to said elevation regulation means 212, rotation regulation means 222 and/or tilt regulation means 232 for manual regulation of said elevation means 80, rotation means 70 and/or tilt means 90 and consequently regulation of position of said cab module 52.

Above hydraulic elevation actuators 85a, 85b for selectively regulating the relative position between the upright support element 82 and elevation support element 86. The elevation actuators may alternatively be constituted by any suitable type of actuator such as en electric actuator or a pneumatic actuator.

Above tilt actuators 94a, 94b for selectively regulating tilt about said tilt axis X1 between a first and a second position has been described. The tilt actuators may alternatively be constituted by any suitable type of actuator such as an electric actuator or a pneumatic actuator.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

Below several aspects of the device for a vehicle cab and a vehicle comprising such a cab described herein are listed.

Aspect 1. A device for a vehicle cab (50) of a vehicle (10), said vehicle cab (50) comprising a cab module (52) configured for attachment to a chassis beam (30) via a support device (60) arranged to support said cab module (52), said support device (60) comprising rotation means (70) for rotation of said vehicle cab (50), characterized in that said support device (60) comprises elevation means (80) for raising/lowering of said cab module (60).

Aspect 2. A device according to aspect 1, wherein said elevation means (80) comprises an upright support element

(82) configured for stationary attachment to said chassis beam (30) and an elevation support element (86) configured for supporting said cab module (52) and being displaceably connected to said upright support element (82).

Aspect 3. A device according to aspect 2, wherein said upright support element (82) comprises at least one elevation actuator (85a 85b) for selectively regulating the relative position between the upright support element (82) and the elevation support element (86) between a first and a second elevation position in longitudinal direction of said upright support element (82).

Aspect 4. A device according to aspect 2 or 3, wherein said elevation support element (86) is displaceably connected to said upright support element (82) via at least one guide path (82c, 82d) running longitudinally relative to said upright support element (82).

Aspect 5. A device according to aspect 4, wherein said guide path (82c, 82d) comprises at least one channel (82c, 82d) running in the longitudinal direction of said upright support element (82).

Aspect 6. A device according to aspect 3, wherein said at least one elevation actuator (85a 85b) is a hydraulic actuator.

Aspect 7. A device according to any of aspects 2-6, wherein said upright support element (82) is configured for stationary attachment to said chassis beam (30) such that the main extension of the direction of said upright support element (82) becomes mainly orthogonal to said chassis beam (30).

Aspect 8. A device according to any preceding aspect, wherein said rotation means (70) comprises a rotator (74) connected to said cab module (52), said rotator being rotatable relative to said elevation means (80).

Aspect 9. A device according to aspect 3, wherein said rotator (74) is journally connected with said elevation means (80).

Aspect 10. A device according to aspect 8 or 9, wherein said rotator (74) is configured to facilitate rotation of said cab module about a rotation axis (Y) mainly orthogonal to a plane formed by an underside (52f) of the cab module (52).

Aspect 11. A device according to any preceding aspect, wherein said support device (60) comprises tilt means (90) for tilting said cab module (52).

Aspect 12. A device according to aspect 11, wherein said tilt means (90) is pivotally connected to said elevation means (80) about a tilt axis (X1) running transverse to the longitudinal direction of the vehicle such that said tilt support element (86) may tilt about said tilt axis (X1) for causing tilt of said cab module (52).

Aspect 13. A device according to aspect 12, wherein said tilt support element (86) comprises at least one tilt actuator (94a, 94b) for selectively regulating tilt about said tilt axis (X1) between a first and a second tilt position.

Aspect 14. A device according to aspect 13, wherein said at least one tilt actuator (94a, 94b) is a hydraulic actuator.

Aspect 15. A device according to any of aspect 6, wherein said at least one elevation actuator (85a, 85b) is configured for coupling to a gas accumulator (100) with restriction function such that said at least one elevation actuator also provides damping of said cab module (52).

Aspect 16. A device according to any preceding aspect, wherein at least one of said elevation means (80), tilt means (90) and rotation means (70) is arranged to be regulated automatically based on sensor data.

Aspect 17. A device according to any preceding aspect, wherein at least one of said elevation means (80), tilt means (90) and rotation means (70) is arranged to be regulated manually based on control commands provided by a vehicle operator via an actuator.

Aspect 18. A device according to aspect 17, wherein said actuator is arranged to provide pre-programmed positions for regulation of at least one of said elevation means (80), tilt means (90) and rotation means (70).

Aspect 19. Vehicle (10) comprising a device according to any of aspects 1-18.

Aspect 20. Vehicle according to aspect 19, where said vehicle is a forestry machine.

Aspect 21. Vehicle according to any of aspect 19 or 20, where said vehicle is a forwarder.

Aspect 22. Vehicle according to any of aspects 19 to 21, where said vehicle is hybrid driven.

The invention claimed is:

1. A device for a vehicle cab of a vehicle, said vehicle cab comprising a cab module configured for attachment to a chassis beam via a support device arranged to support said cab module, said support device comprising:
an elevation device for raising/lowering of said cab module, wherein said elevation device comprises an upright support element configured for stationary attachment to said chassis beam and an elevation support element configured for supporting said cab module and being displaceably connected to said upright support element, and
a rotation device for rotation of said vehicle cab, wherein said rotation device comprises a rotator connected to said cab module and rotatably connected to said elevation device by means of a journalled connection,
characterized in that said support device further comprises a tilt device comprising a tilt support element pivotally connected to said elevation device about a tilt axis running transverse to the longitudinal direction of the vehicle such that said tilt support element is tiltable about said tilt axis for causing tilt of said cab module.

2. The device to of claim 1, wherein said upright support element comprises at least one elevation actuator for selectively regulating the relative position between the upright support element and the elevation support element between a first and a second elevation position in longitudinal direction of said upright support element.

3. The device of claim 1, wherein said elevation support element is displaceably connected to said upright support element via at least one guide path running longitudinally relative to said upright support element.

4. The device of claim 3, wherein said guide path comprises at least one channel running in the longitudinal direction of said upright support element.

5. The device of claim 2, wherein said at least one elevation actuator is a hydraulic actuator.

6. The device of claim 1, wherein said upright support element is configured for stationary attachment to said chassis beam such that the main extension of the direction of said upright support element becomes mainly orthogonal to said chassis beam.

7. The device of claim 1, wherein said rotator is configured to facilitate rotation of said cab module about a rotation axis mainly orthogonal to a plane formed by an underside of the cab module.

8. The device of claim 1, wherein said tilt support element comprises at least one tilt actuator for selectively regulating tilt about said tilt axis between a first and a second tilt position.

9. The device of claim 8, wherein said at least one tilt actuator is a hydraulic actuator.

10. The device of claim 5, wherein said at least one elevation actuator is configured for coupling to a gas accumulator with restriction function such that said at least one elevation actuator also provides damping of said cab module.

11. The device of claim 1, wherein at least one of said elevation device, tilt device and rotation device is arranged to be regulated automatically based on sensor data.

12. The device of claim 1, wherein at least one of said elevation device, tilt device and rotation device is arranged to be regulated manually based on control commands provided by a vehicle operator via an actuator.

13. The device of claim 12, wherein said actuator is arranged to provide pre-programmed positions for regulation of at least one of said elevation device, tilt device and rotation means device.

14. A vehicle comprising a device of claim 1.

15. The vehicle of claim 14, where said vehicle is a forestry machine.

16. The vehicle of claim 14, where said vehicle is a forwarder.

17. The vehicle of claims 14, where said vehicle is hybrid driven.

* * * * *